US009530055B2

(12) United States Patent
Goodwin et al.

(10) Patent No.: US 9,530,055 B2
(45) Date of Patent: Dec. 27, 2016

(54) ON-GROUND OR NEAR-GROUND DISCRETE OBJECT DETECTION METHOD AND SYSTEM

(71) Applicant: UMWELT (AUSTRALIA) PTY. LIMITED, Toronto, New South Wales (AU)

(72) Inventors: Andrew Goodwin, Toronto (CA); Peter Jamieson, Bolton Point (AU); Jennifer Pengilly, New Lambton (AU); Patrick Poissant, Fennell Bay (AU); Stephen Swabey, Fennell Bay (AU)

(73) Assignee: Anditi Pty Ltd, Teralba (AU)

( * ) Notice: Subject to any disclaimer, the term of this patent is extended or adjusted under 35 U.S.C. 154(b) by 0 days.

(21) Appl. No.: 14/430,115

(22) PCT Filed: Sep. 20, 2013

(86) PCT No.: PCT/AU2013/001091
§ 371 (c)(1),
(2) Date: Mar. 20, 2015

(87) PCT Pub. No.: WO2014/043764
PCT Pub. Date: Mar. 27, 2014

(65) Prior Publication Data
US 2015/0248577 A1    Sep. 3, 2015

(30) Foreign Application Priority Data

Sep. 21, 2012    (AU) .................................. 2012904160

(51) Int. Cl.
*G06K 9/00*    (2006.01)
*G06T 17/05*    (2011.01)
(Continued)

(52) U.S. Cl.
CPC .......... *G06K 9/0063* (2013.01); *G01S 7/4802* (2013.01); *G01S 17/89* (2013.01); *G06T 17/05* (2013.01)

(58) Field of Classification Search
None
See application file for complete search history.

(56) References Cited

U.S. PATENT DOCUMENTS 8,244,026 B2 *   8/2012   Nahari ................. G06K 9/0063
                                                        382/154
8,396,293 B1 *   3/2013   Korah .................. G06K 9/0063
                                                        382/170

(Continued)

FOREIGN PATENT DOCUMENTS

WO    WO2012112588    9/2012

OTHER PUBLICATIONS

Forlani et al., "Complete classification of raw LIDAR data and 3D reconstruction of buildings", Pattern Anal Appilca (2006) 8:357-374.*

(Continued)

*Primary Examiner* — Soo Jin Park
(74) *Attorney, Agent, or Firm* — Boulware & Valoir

(57) ABSTRACT

A method for detection of on-ground or near-ground discrete objects having characteristic features from terrain height data characterizing a search area comprising the steps of: processing the terrain height data to form a regular grid containing elevation and slope data at each grid point; and analyzing said gridded terrain height data to identify said on-ground or near-ground discrete objects within said search area.

22 Claims, 9 Drawing Sheets

(51) Int. Cl.
*G01S 17/89* (2006.01)
*G01S 7/48* (2006.01)

(56) References Cited

U.S. PATENT DOCUMENTS

| | | |
|---|---|---|
| 2009/0304236 A1 | 12/2009 | Francini et al. |
| 2013/0096886 A1* | 4/2013 | Vorobyov ............ G01C 11/00 703/1 |
| 2013/0218472 A1* | 8/2013 | Fu ........................ G06T 7/0081 702/5 |
| 2014/0177928 A1* | 6/2014 | Bangay ............ G06K 9/00651 382/113 |
| 2015/0172628 A1* | 6/2015 | Brown .................... G06T 17/10 348/47 |

OTHER PUBLICATIONS

San et al., "Building extraction from high resolution satellite images using Hough transform", ISPRS 2010.*

Karsli et al., "Building extraction from laser scanning data", ISPRS 2008.*

Wang et al., "Segmentation of LIDAR point clouds for building extraction", ASPRS 2009.*

Meng, Xuelian et al., Ground Filtering Algorithms for Airborne LiDAR Data: A Review of Critical Issues, Remote Sensing 2010, published Mar. 22, 2010 [online], [retrieved on Nov. 7, 2013], Retrieved from the Internet <URL: www.mdpi.com/2072~4292!2/3/833/pdf >.

* cited by examiner

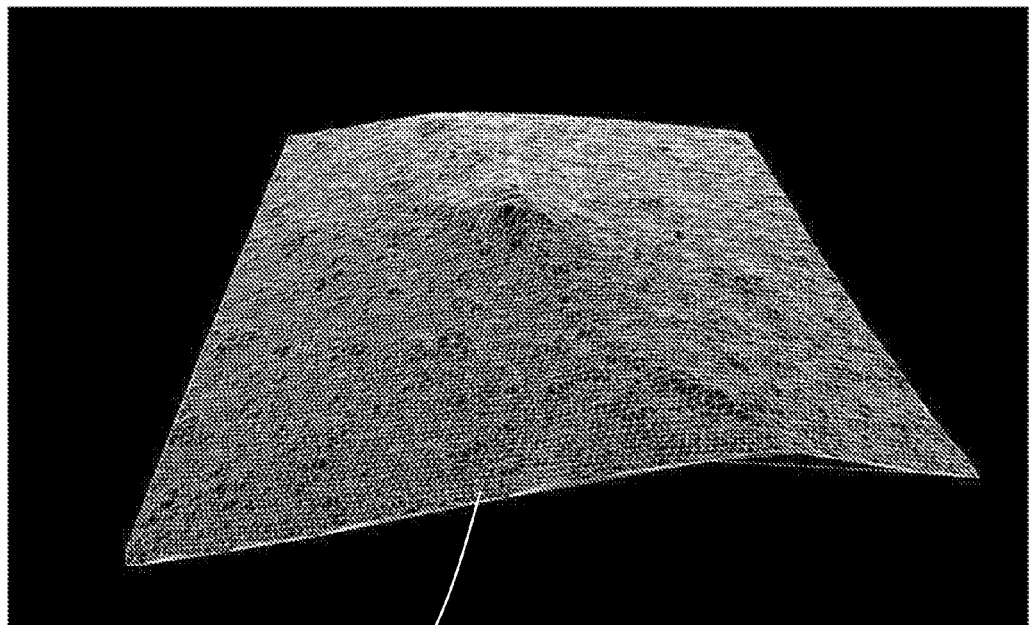
305 Figure 6
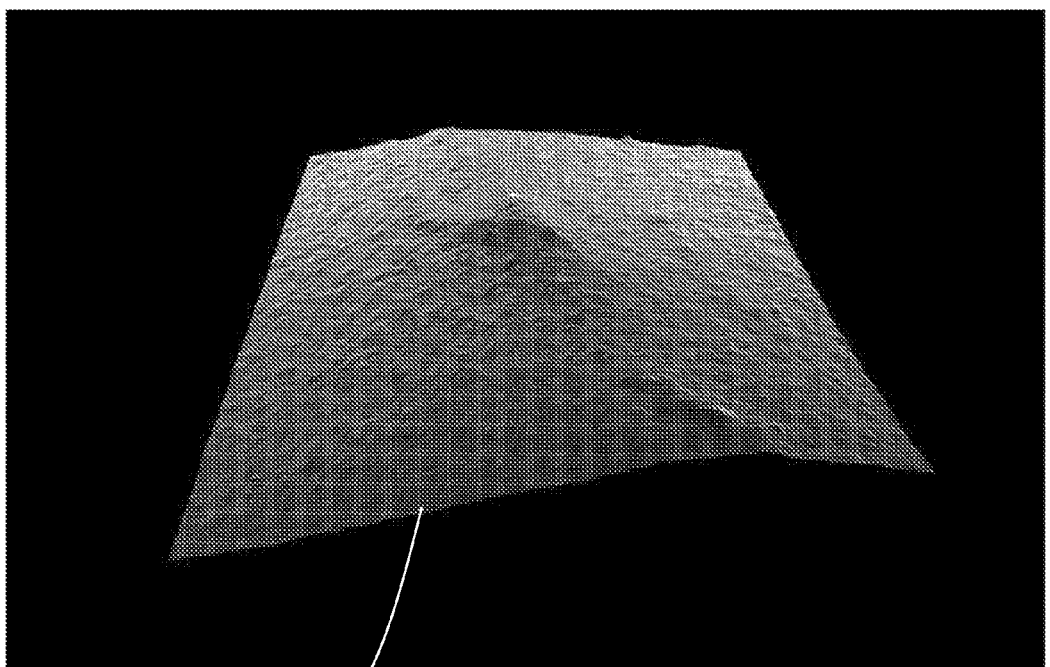
309 Figure 7

ON-GROUND OR NEAR-GROUND DISCRETE OBJECT DETECTION METHOD AND SYSTEM

PRIOR RELATED APPLICATIONS

This application claims priority to PCT Application No. PCT/AU2013/001091, which was filed on Sep. 20, 2013, and Australia Patent Application No. 2012904160, which was filed on Sep. 21, 2012, each of which is incorporated by reference in its entirety for all purposes.

TECHNICAL FIELD

The present invention relates generally to processing techniques for large data sets such as for example point-cloud data obtained using Light Detection and Ranging (LiDAR) techniques for detection and/or location of discrete on-ground or near-ground objects and in particular to methods and apparatus for processing LiDAR data to extract on-ground or near-ground discrete objects from LiDAR data.

The invention has been developed primarily for use as method and system for detection of on-ground or near-ground discrete objects having known features/characteristics using available data sets for example LIDAR height data characterising a search area.

BACKGROUND

Any discussion of the background art throughout the specification should in no way be considered as an admission that such background art is prior art, nor that such background art is widely known or forms part of the common general knowledge in the field.

Identification of on-ground or near-ground discrete objects is a common task for specialist scientists and engineers. As used herein, the term "on-ground object" refers to localised geographical objects at the ground level (i.e. that is connected to or part of the ground) e.g. terrain and/or contour features. Examples of such objects include natural landforms such as drumlins (a 'little ridge', typically an elongated hill in the shape of an inverted spoon or half-buried egg formed by glacial ice acting on underlying unconsolidated till or ground moraine); ecological features such as termite mounds; archaeological features such as tumuli (i.e. mounds of earth), craters, and stones raised over a grave or graves. Tumuli are also known as barrows, burial mounds, Hügelgrab or kurgans). As used herein, the term "near-ground object" refers to objects, for example trees, spinifex, salt bush, structural or man-made objects such as buildings or vehicles that, generally, are above the ground level or extend from ground level, and are usually located on or resting on the ground. Examples of such objects include built objects such as buildings, water tanks or motor vehicles.

The identification of on-ground or near-ground discrete objects may be undertaken by ground-based observational field survey; or by remote sensing techniques using electromagnetic energy (e.g. laser energy), including energy in the wavelengths of light visible to human eyes. Various types of survey techniques may be combined to improve the likelihood of detection of on-ground or near-ground objects. These techniques include the use of data acquired by techniques such as, for example, Light Detection and Ranging (LiDAR).

LiDAR data is collected by emission of a laser from an instrument typically mounted on the ground or in an aircraft. A LiDAR detection unit typically is situated in the same instrument as the emitter. The LiDAR unit transmits and detects laser pulses which are reflected off objects on the ground or in the air, including: soil, rocks, leaves, branches, vehicles, buildings, birds, etc. The LiDAR unit measures the time, direction and strength of each reflected laser pulse and the position, velocity and orientation of any transporting vehicle are calculated to determine the geographical position of the reflected laser pulse.

Executing the identification of on-ground or near-ground discrete objects using LiDAR over a wide area requires substantial effort where the number of such objects is large, or where the area to be examined is large. In addition, even when LiDAR data is used for survey purposes, where the area to be examined for such objects is inaccessible by vehicle, it may be infeasible to undertake extensive field calibration of any objects identified in LiDAR data.

An additional difficulty with the use of remotely-sensed LiDAR data is that it may be used only to identify objects on the ground that may adequately be distinguished in the available data from surrounding materials and features, which may be considered as 'noise' within the data.

Given the problems identified above, there is a need for an improved technique for identification of on-ground or near-ground discrete objects from remotely-sensed data such as LiDAR.

DEFINITIONS

The following definitions are provided as general definitions and should in no way limit the scope of the present invention to those terms alone, but are put forth for a better understanding of the following description.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealised or overly formal sense unless expressly so defined herein. For the purposes of the present invention, additional terms are defined below.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The present invention is described below with reference to block diagrams and/or flowchart illustrations of methods, apparatus (systems) and/or computer program products according to aspects and arrangements of the invention. It is to be understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable non-transitory storage medium having computer-usable or computer-readable program code embodied in the medium for use by or in connection with an instruction execution system. In the context of this document, a computer-usable or computer-readable medium may be any non-transitory medium that can contain, store, communicate, propagate, or transport the program for use by or in connection with the instruction execution system, apparatus, or device.

The computer-usable or computer-readable non-transitory medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fibre, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

SUMMARY

It is an object of the present invention to substantially overcome or at least ameliorate one or more of the disadvantages of the prior art, or at least to provide a useful alternative.

In one arrangement, LiDAR height data within the area or areas being examined is analysed to determine the underlying trend in the slope of the ground. In another arrangement, LiDAR height data is analysed to distinguish individual objects having features of a particular characteristic shape, size, height, or other characteristics where the ground slope of the features of the object differs from the surrounding underlying trend in the slope of the ground.

In a particular arrangement, the characteristic features of the object being sought in the data is analysed to determine whether the individual object distinguished from the underlying ground slope is of a character similar (i.e. has similar features) to the object being sought within the data.

In an arrangement, a system includes a processor that is programmed to analyse a number of LiDAR data points with a search area. The processor is programmed to search the LiDAR data for points that may represent the on-ground or near-ground discrete object being sought. For LiDAR data points that may represent the on-ground or near-ground discrete object of interest, the processor is programmed to determine whether the geographical features such as size and extent of the candidate object so distinguished falls within the range of sizes known to exist for that object. In some situations LiDAR data used in this step may be classified using nonconventional classification schemes to allow on-ground objects to be detected by the techniques described. Such nonconventional classifications may also allow above ground objects to be detected.

In another arrangement, the processor is programmed to calculate whether a candidate object observed in the LiDAR data is likely to exhibit the geometry of the object of interest being sought in the LiDAR data. This arrangement includes analysis of the likely three dimensional expression of the characteristic features of the object, even where this is not observed directly by LiDAR data points.

According to a first aspect, there is provided a method for detection of on-ground or near-ground discrete objects having characteristic features from terrain height data characterising a search area comprising the steps of: processing the terrain height data to form a regular grid containing elevation and slope data at each grid point; and analysing said gridded terrain height data to identify said on-ground or near-ground discrete objects within said search area.

In a particular arrangement of the first aspect, there is provided a method for detection of on-ground or near-ground discrete objects having characteristic features from terrain height data characterising a search area. The method may comprise the step of processing the terrain height data to form a regular grid containing elevation and slope data at each grid point. The method may further comprise the step of analysing said gridded slope data using a Ground Feature Transformation (GFT) function to identify said on-ground or near-ground discrete objects within said search area.

The characteristic features of the on-ground or near-ground object comprises one or more of shape, changes in shape, size, height, reflectance, absorbance, shadow, slope, aspect, or land-form context (the object may be found within certain landscapes which themselves have characteristic features.

The forming of said regular grid may comprise the steps of: determining the characteristic features (for example size, shape, height or other characteristics) of said on-ground or near-ground object (g) and the characteristic size of discriminatory elements (e) of said on-ground or near-ground object (g); determining a slope analysis scale for the on-ground or near-ground object (g) and for the discriminatory elements (e); determining a suitable grid resolution with reference to the characteristic size of said discriminatory elements (e) such that the grid provides sufficient sampling points within the scale of the discriminatory elements (e) to permit identification of said discriminatory elements and thus identification of said near ground object; and processing the terrain height data to form gridded height data comprising a regular grid having the determined grid resolution wherein said gridded height data comprises elevation and slope data at each grid point. The grid may extend beyond the region over which the Ground Feature Transform (GFT) function will operate to provide sufficient information surrounding each calculation point such that there are minimal or no artefacts generated as a result of calculations near the edges.

The gridded height data may comprise a gridded height-field having the determined grid resolution and elevation data at each grid point as described below. The elevation data may be determined by triangulation of ground points in the LiDAR data. This triangulation step is a precursor to gridding. In this sense, the ground points in the LiDAR data are first triangulated to form an irregular network (for example see triangulated irregular network 305 of FIG. 6), then gridded to form a regularly spaced grid (for example see gridded height-field 309 of FIG. 7). The height values at each of the grid points are calculated by interpolating the ground triangulation at the determined grid resolution. The resulting heightfield is dependent on LiDAR data being correctly classified. In some situations nonconventional classification schemes may be employed to generate digital surface models, additionally allowing above ground objects to be detected by the techniques described below.

The local slope data at each grid point may be based on a 9-point grid centred at the grid point. The slope data at each grid point may be represented as a vector.

The method of the first aspect may further comprise calculation of an elemental slope ($S_e$) and a general slope ($S_g$) at each said grid point. The elemental slope ($S_e$) is determined at a scale that is related to the size of the discriminatory element within the object. The general slope ($S_g$) is determined at a scale that relates to a size that is larger than the object. The data used to derive the general slope may be the same data as is used to derive the elemental slope. However, the scale at which the slopes are calculated differs: the general slope ($S_g$) is calculated at a scale larger than the scale of the element (characteristic feature) of the object being sought and aims to capture the prevailing slope of the underlying terrain, whereas the elemental slope ($S_e$) is calculated at a scale similar to the size of the discriminatory elements of the object sought to maximise its expression.

Analysing the gridded terrain height data may comprise the step of using a Ground Feature Transform function (GFT), detecting features within said gridded height-field by analysing the slope of the terrain around each grid point of said gridded height-field. The Ground Feature Transform function may be defined by the relation:

$$GFT = f(GFT_e, GFT_g)$$

The GFT may be adapted for detection of circular objects in said gridded height-field by analysing the slope of the terrain around each grid point. The circular objects may comprise an on-ground or near-ground discrete feature comprises, for example, a mallee-fowl mound, termite mound, drumlin, tumulus, sinkhole, defensive mound, earthwork, crater, or a built object.

The detection of circular objects may comprise, for each grid point of the height-field data, analysing the slope of the height-field data radially from the grid point using a series of search radii characterising typical features of an on-ground or near-ground discrete object of interest at selected radial search increments.

The method may be readily adapted for detection of non-circular objects by modification of the parameters of the GFT, the method disclosed herein may be applied to detection of on-ground or near ground non-circular objects such as, for example elliptical objects such as drumlins, tumuli, sinkholes, craters, defensive mounds, earthworks, vessels, bridge revetments, or other non-circular objects such as, for example, buildings or vehicles or wildlife.

The radial analysis of the height-field data may comprise the use of two types of search radius: the elemental search radius that is determined with reference to the size of the discriminatory element of characteristic features of the object; and the general search radius that is determined with reference to the size of the object as a whole. There may be many elemental search radii used in the search routine.

Analysing of the slope of the height-field data may comprise executing a plurality of searches for on-ground or near-ground discrete objects around each grid point. Each search for on-ground or near-ground discrete objects around each grid point may comprise use of different search radii for detection of on-ground or near-ground discrete objects of different sizes.

For each search execution, the search for on-ground or near-ground discrete objects around each grid point may comprise the steps of: determining two values ($r_e$, $d_e$) for calculation of the search radii to detect on-ground or near-ground discrete objects of that scale; determining an incremental search angle with reference to the density of available sampling points within the discriminatory element;

The values for calculation of the search radii are based on the expected size of the on-ground or near-ground discrete object of interest and may comprise (i) an elemental radius, $r_e$, extending from the centroid of the object to the centroid of a discriminatory element of said object; and (ii) an expected variation, $d_e$, in the size of the discriminatory element of the on-ground or near-ground discrete object.

The expected variation, $d_e$, may be used to calculate two elemental search radii ($r_e + \frac{1}{2}d_e$) and ($r_e - \frac{1}{2}d_e$) to provide sampling points within the discriminatory element. Optimally the selected grid size must be smaller than $\frac{1}{2}d_e$.

An additional general radius, $r_g$, may be calculated such that $r_g$ extends beyond the characteristic size of the on-ground or near-ground discrete object of interest. The general radius, $r_g$, may be calculated by the relation: $r_g = X * r_e$ where X is a suitable multiplier. For example, X may be equal to an integer and may, in particular arrangements be equal to 2, 3, 4 or other suitable integer value.

The incremental search angle is used to provide n radial searches around each grid point. The incremental search angle may be determined with reference to the density of available sampling points in said gridded height data within said discriminatory element. In particular arrangements, each radial search may use a unique value from the available grid of slope vectors.

Searching radially from each grid point in the gridded slope data using said incremental search angle comprising, at each search angle increment, the further steps of:

Determining Feature Slope Vectors (FS) for points radial to the search kernel centroid, within the discriminatory element, at each elemental search radius ($r_e$, $r_e+\frac{1}{2}d_e$, $r_e-\frac{1}{2}d_e$).

Using the Feature Slope Vectors (FS) within the discriminatory element to determine the elemental contribution to the GFT Function ($GFT_e$);

Determining the elemental contribution to the GFT Function ($GFT_e$) by calculating the magnitude and direction components of each FS using the Elemental Slope Magnitude Contribution (ESMC) and the Vector Alignment Contribution (VAC) functions;

Assigning a high weighting for values close to the characteristic values of the on-ground or near-ground discrete object of interest; and Determining the Feature Slope Vector (FS) for the point radial to the search kernel centroid at the general radius, $r_g$;

Determine the contribution of the general slope, $S_g$, to the GFT, inclusive of any weighting;

Determining the general contribution to the GFT Function ($GFT_g$) by weighting the magnitude component of FS at the general radius using the General Slope Magnitude Contribution (GSMC) function.

The Feature Slope Vectors may be a function of the elemental and general slope vectors at each grid point. The method may further comprise the steps of: calculating a transform value for each grid point from the GFT values calculated during each radial search at the grid point according to the relation $GFT=f(GFT_1, GFT_2, \ldots, GFT_n)$ and, where the resultant GFT exceeds a nominated threshold T, store the result in a grid; and repeating the search for a new set of search radii wherein each search process is defined by an $r_e$ and a $d_e$, which are then used to determine the actual search radii i.e. $r_g=2*r_e$, $r_{e1}-r_e+\frac{1}{2}d_e$, $r_{e2}=r_e-\frac{1}{2}d_e$ etc. In general $r_e$ and $d_e$ set the search scale for each iteration of the search process wherein each iteration of the search is conducted over a new search scale defined by updated values of $r_e$ and $d_e$ at each iteration. Each search process is defined by an $r_e$ and a $d_e$, which are then used to determine the actual search radii, for example $rg=2*r_e$, $r_e+\frac{1}{2}d_e$, $r_{e2}=r_e-\frac{1}{2}d_e$ etc. In particular arrangements, the elemental radius $r_e$ of the on-ground or near-ground discrete object of interest and the expected variation, $d_e$ of the discriminatory element of the object of interest determine the search scale, and the search is repeated for a new search scale according to the expected characteristic features of the on-ground or near-ground discrete object of interest (i.e. the search is repeated multiple times at each grid point, each time searching for a object of interest with a radius in the range of expected size for the object of interest).

The method may further comprise the steps of: aggregating the result grids obtained for each search radius; and aggregating the result grids comprising clusters of grid cells corresponding to possible central grid points corresponding to said on-ground or near-ground discrete object of a given radius.

The method may further comprise displaying the aggregated result grid as a sparse matrix or alternatively, as a rasterised or greyscale image (or other suitable form) for further analysis of probable on-ground or near-ground discrete object locations.

According to a second aspect there is provided a system for detection of near-ground discrete objects having characteristic features from terrain height data characterising a search area, the system comprising:

Input means for receiving an input comprising said terrain height data;

Processing means for processing the terrain height data to form a regular grid containing elevation and slope data at each grid point;

Analysis means for analysing said gridded terrain height data to identify said near-ground discrete objects within said search area; and Output means for outputting a representation of said analysed gridded terrain height data for detection of near-ground discrete objects.

In an arrangement of the second aspect there is provided a system for detection of on-ground or near-ground discrete objects having characteristic features from terrain height data characterising a search area. The system may comprise input means for receiving an input comprising said terrain height data. The system may further comprise processing means for processing the terrain height data to form a regular grid containing elevation and slope data at each grid point. The system may further comprise analysis means for analysing the gridded slope data to identify the on-ground or near-ground discrete objects within the search area. The system may further comprise output means for outputting a representation of the analysed gridded slope data for detection of the on-ground or near-ground discrete object or objects.

According to a third aspect, there is provided a non-transitory computer readable medium comprising a program for detection of on-ground or near-ground discrete objects having characteristic features from terrain height data characterising a search area, the program controlling the operation of a data processing apparatus on which the program executes to perform the steps of: processing the terrain height data to form a regular grid containing elevation and slope data at each grid point; and analysing said gridded terrain height data to identify said on-ground or near-ground discrete objects within said search area.

In an arrangement of the third aspect, there is provided a non-transitory computer readable medium comprising a program for detection of on-ground or near-ground discrete objects having characteristic features from terrain height data characterising a search area. The program may control the operation of a data processing apparatus. The program may control the operation of the data processing apparatus to execute the step of processing the terrain height data to form a regular grid containing elevation and slope data at each grid point. The program may control the operation of the data processing apparatus to execute the step of analysing the gridded slope data to identify the on-ground or near-ground discrete objects within the search area. The data processing apparatus may comprise a computing device.

In the aspects of the invention, the object being searched for may be any object that can be defined mathematically, or comprise features that can be mathematically defined, or both, in terms of the characteristic features of the object. For example, the features of the object may comprise one or more of the object's shape, size and/or other characteristic features of the object of interest as would be appreciated by the skilled addressee.

The computing device, in general (depicted in FIG. 13), comprises a processor to execute computer instructions stored in a non-transitory computer readable storage medium such as random access memory and/or read only memory coupled to the processor. Such processors may include a microprocessor, an ASIC, an FPGA and state machines. Such processors include, or may be in communication with, media, for example computer-readable media, which stores instructions that, when executed by the processor, cause the processor to perform the steps described herein. The computer readable media may comprise a program for performing the step of the method(s) disclosed herein, said program controlling the operation of a data processing apparatus on which the program executes to perform the steps of the method(s). Examples of suitable computer-readable media may include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other non-transitory medium from which a computer processor can read instructions. Also, various other forms of computer-readable media may transmit or carry instructions to a computer, including a router, private or public network, or other transmission device or channel, both wired and wireless. The client device may further comprise a data connection for transmitting or carrying instructions to a computer for example connection to a network e.g. a local area network, or wide area network or the internet. In other arrangements an intranet may be used. The data connection may be a wireless data connection using a suitable wireless connection protocol. In further arrangements, methods according to the present invention may be performed in a single computing device.

BRIEF DESCRIPTION OF THE DRAWINGS

Arrangements of the invention will now be described, by way of an example only, with reference to the accompanying drawings wherein:

FIG. 1 shows a flow chart of the method 100 of identifying on-ground or near-ground discrete objects;

FIG. 2 shows a flow chart of the method 200 for determining the search and analysis parameters;

FIG. 3 shows a flow chart of the method 300 for determining slope data for the terrain height-field data;

FIG. 4 shows a flow chart of the method 400 to perform the Ground Feature Transform (GFT) Function;

FIG. 5 shows a flow chart of the method 500 to perform the radial search within the GFT;

FIG. 6 shows an example of a Triangulated Irregular Network;

FIG. 7 shows an example of a gridded height-field;

DETAILED DESCRIPTION

Aspects and arrangements of the present invention will be described more fully hereinafter with reference to the accompanying drawings, in which example arrangements of the invention are shown. The aspects and/or arrangements of the present invention may, however, be arranged in many different forms and should not be construed as limited to the arrangements set forth herein. Rather, the presently described arrangements are provided to provide a thorough disclosure to convey the scope of the invention envisaged to the skilled addressee in the field of the art. In the description of the Figures herein, like numbers refer to like elements and/or features.

The methods and systems disclosed herein provide a new approach to processing techniques for large data sets such as, for example point-cloud data obtained using Light Detection and Ranging (LiDAR) techniques, for detection of discrete on-ground or near-ground objects such as, for example, mallee-fowl mounds or similar objects.

Figure 1:
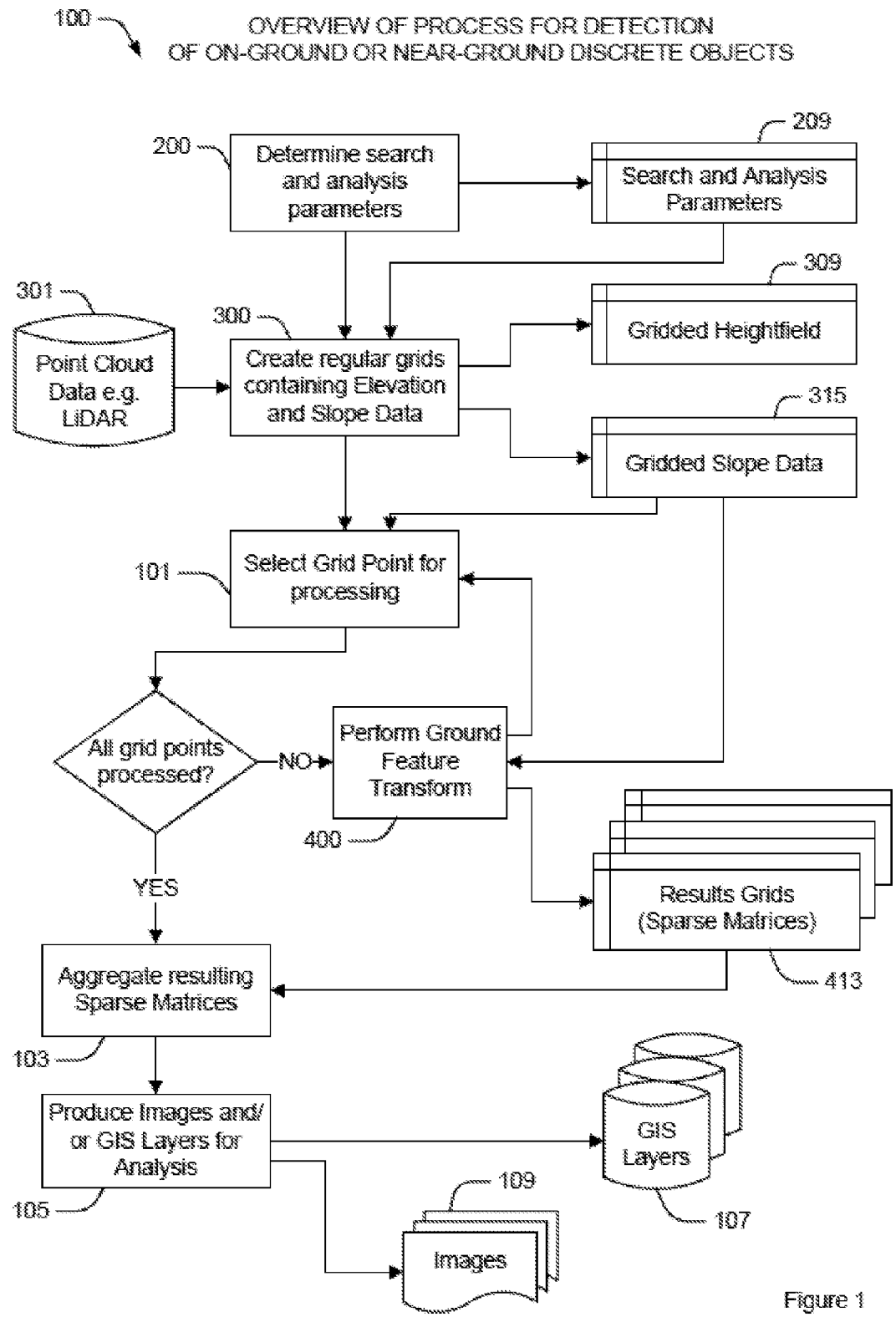
FIGS. 1-5 are flow charts describing a method of identifying on-ground or near-ground discrete objects as disclosed herein, in particular.

Referring to FIG. 1, there is provided a flow chart describing a method 100 of identifying on-ground or near-ground discrete objects. The method 100 is utilised to detect objects in height-field data in a search area of interest, where the height-field data is derived from a suitable method such as for example, point cloud data 301 from LiDAR terrain data of the search area, where characteristic sizes of the object of interest and characteristics sizes of discriminatory elements within the object of interest are known. From the characteristic size of the objects and their discriminatory elements (features), the search and analysis parameters for the feature search are determined 200. An example method 200 of determining the search and analysis parameters for the particular object of interest is depicted in the flow chart of FIG. 2 where the search and analysis parameters are determined from knowledge of characteristic sizes of on-ground or near-ground discrete objects of interest, and the characteristic size of discriminatory elements of the object (s) of interest. The method 200 comprises determining in step 201 the number of radial searches to be undertaken which will determine the incremental search angle around each grid point. The number of radial searches is determined with reference to the density of available sampling points within the discriminatory element. It is optimal to ensure that each radial search selects a unique data point from the gridded terrain data. The method 200 further comprises determining in step 203 characteristic values for (i) the radius of the entire object, $r_g$, and (ii) the radius to the centroid of discriminatory element, $r_e$ of the object of interest. and (iii) the expected variation $d_e$ in the radius $r_e$. Then in step 205 determining slope analysis scales for (i) the entire object of interest (hereafter referred to as the general slope, $S_g$) and (ii) the discriminatory element (hereafter referred to as the elemental slope, $S_e$). Statistical values for the characteristic slope magnitude are determined in step 207 including i) the average value, ii) the standard deviation, and iii) the number of standard deviations to accept in the subsequent search analysis as being representative of an instance of the object of interest.

In step 211 a grid resolution is determined from the characteristic radius values, slope analysis scales and characteristic slope magnitude values for the search and analysis parameters 209 for the object of interest in the height-field data, where the grid resolution is of sufficient resolution to resolve the discriminatory elements and therefore the objects of interest in the height-field data of the search area.

Figure 2:
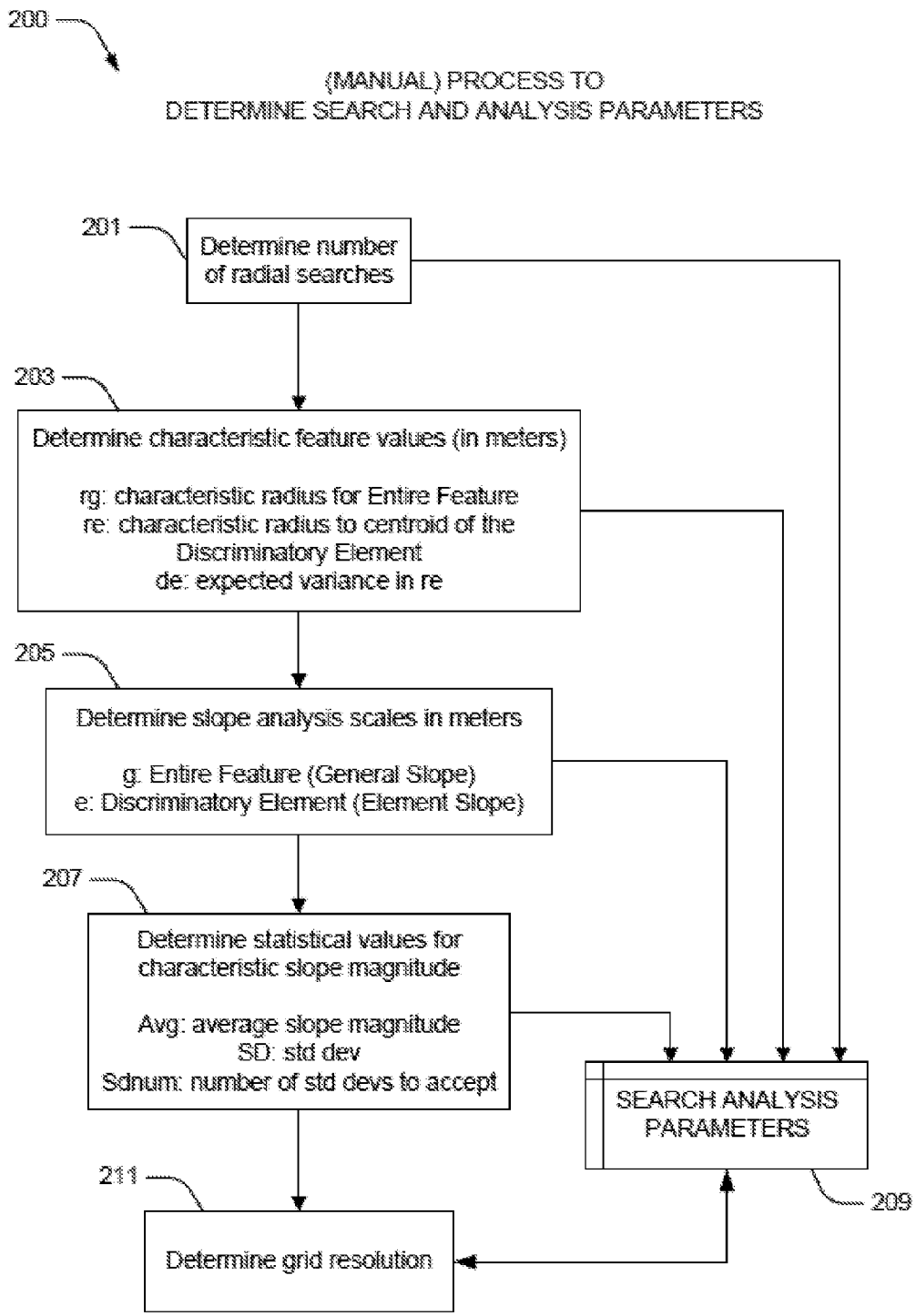

Returning to FIG. 1, the method 100 for detection of on-ground or near-ground discrete objects or features requires the following to be available prior to execution of the methods disclosed herein:

Height data 301 (eg. LiDAR data) of sufficient point density to resolve the object of interest;

Data points classified according to standard ISPRS ( ) or ICM ( ) LiDAR classification codes; and A descriptive model of the geometry of the object to be detected, including the characteristic size of the object and the size and nature of any characteristic features or discriminatory elements of the object that can be used to detect it which are used in the method 200 of FIG. 2 to determine the search and analysis parameters 209.

It is not necessary that the LiDAR data be aligned (i.e. adjacent swathes of data aligned) and better results can be achieved by processing each of the swathes separately. In some circumstances it may be advantageous to process a plurality of swathes together as a single data unit and in this case ensuring that data from adjacent swathes is aligned is optimal, but not required.

Figure 3:
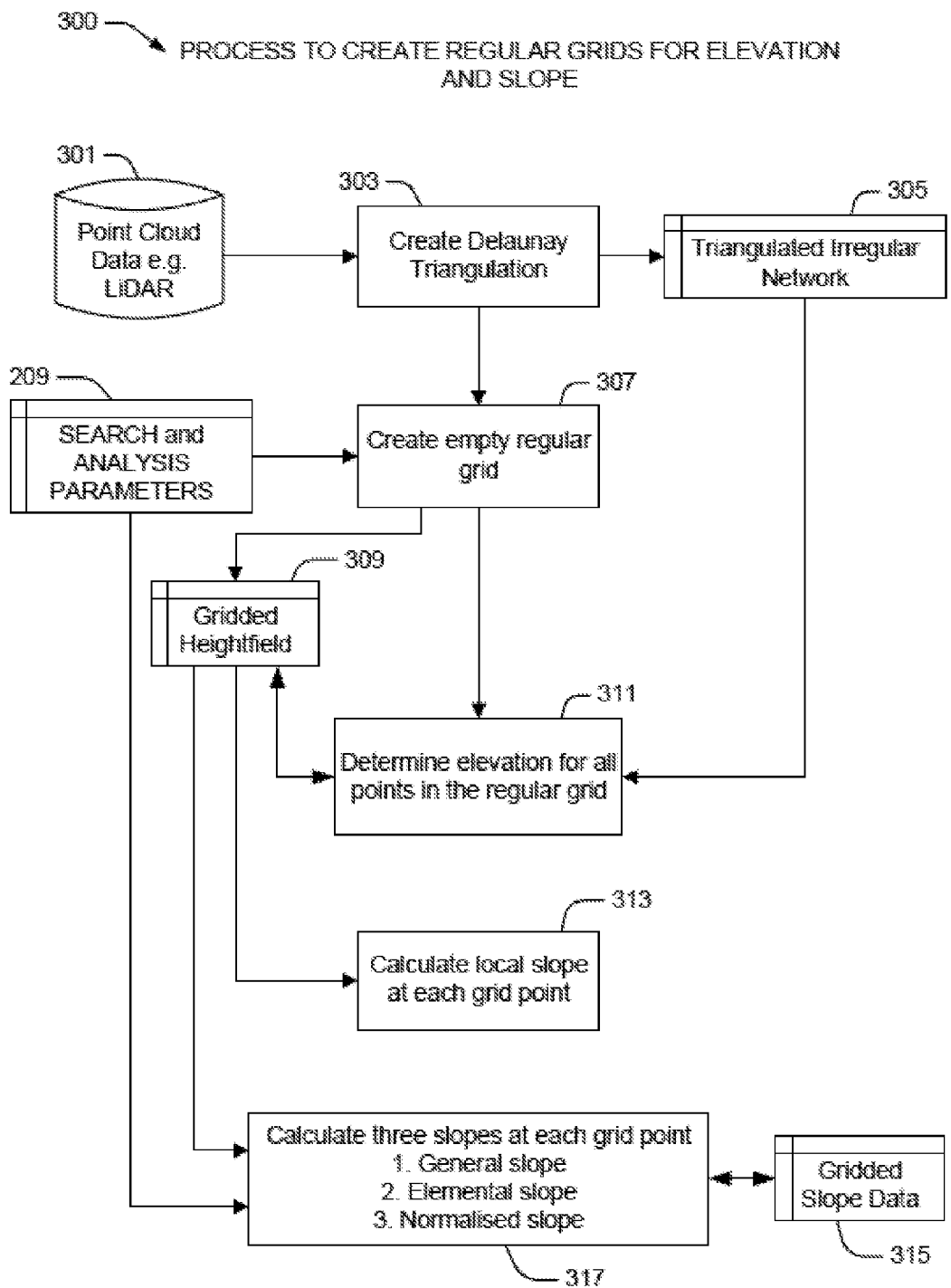

In step 300 of method 100 depicted in FIG. 1, the point cloud data 301 from the LiDAR data and the search and analysis parameters 209 determined in method 200 (of FIG. 2) are used to create regular grids containing elevation and slope data over the search area to form a gridded height-field 309 and gridded slope data 315. FIG. 3 shows a flow chart of a method 300 for determining slope data for the terrain height-field data to form the gridded height-field 309 and gridded slope data 315. FIG. 7 depicts an example gridded height field 309.

The method of searching for on-ground or near-ground discrete objects of interest in terrain height-field data broadly comprises the steps of:

A: Determine characteristic parameters for the search process as depicted in FIG. 2

B: Generate a regular grid containing elevation and slope data as depicted in FIG. 3.

Figure 4:
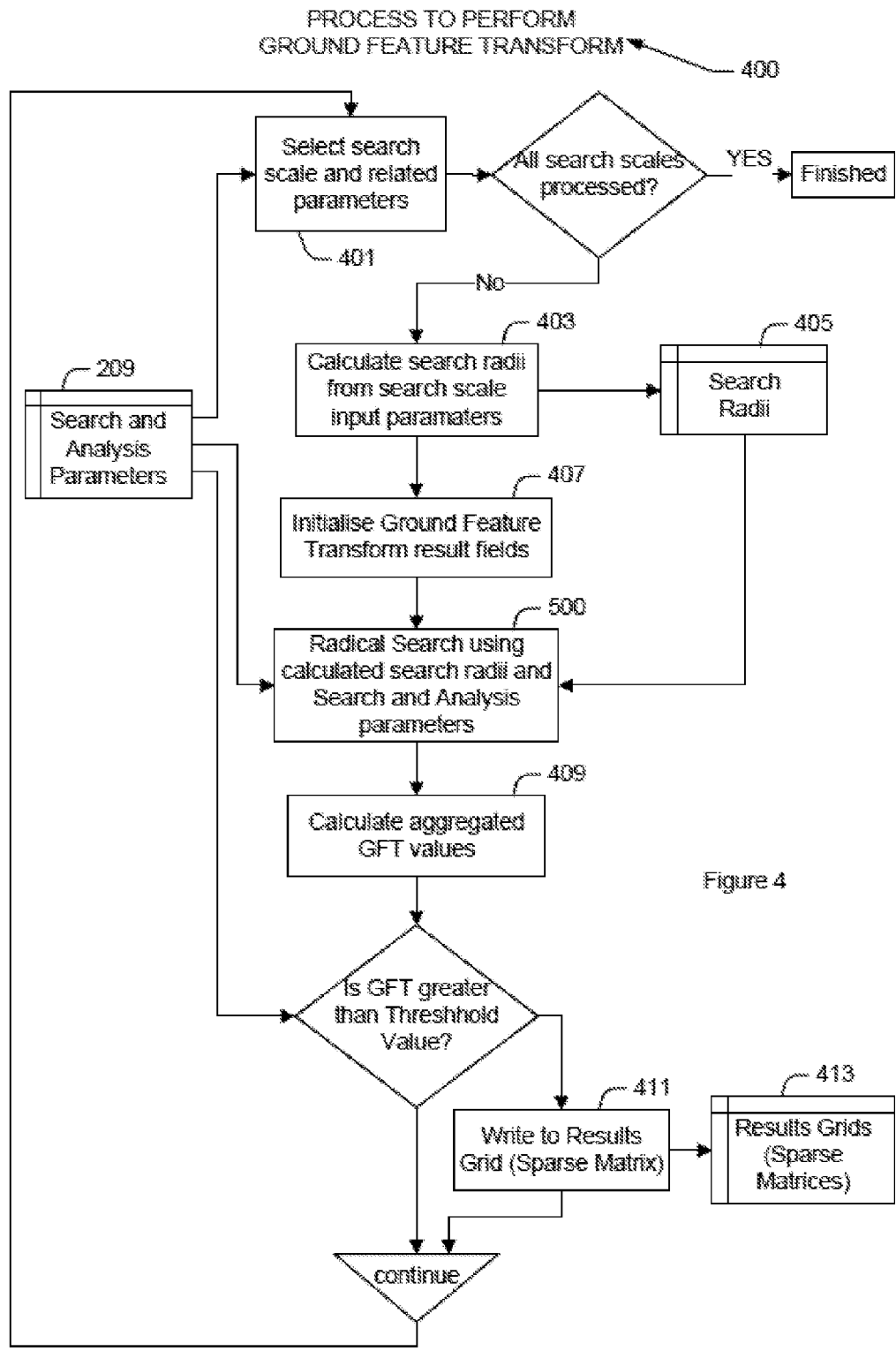
Figure 5:
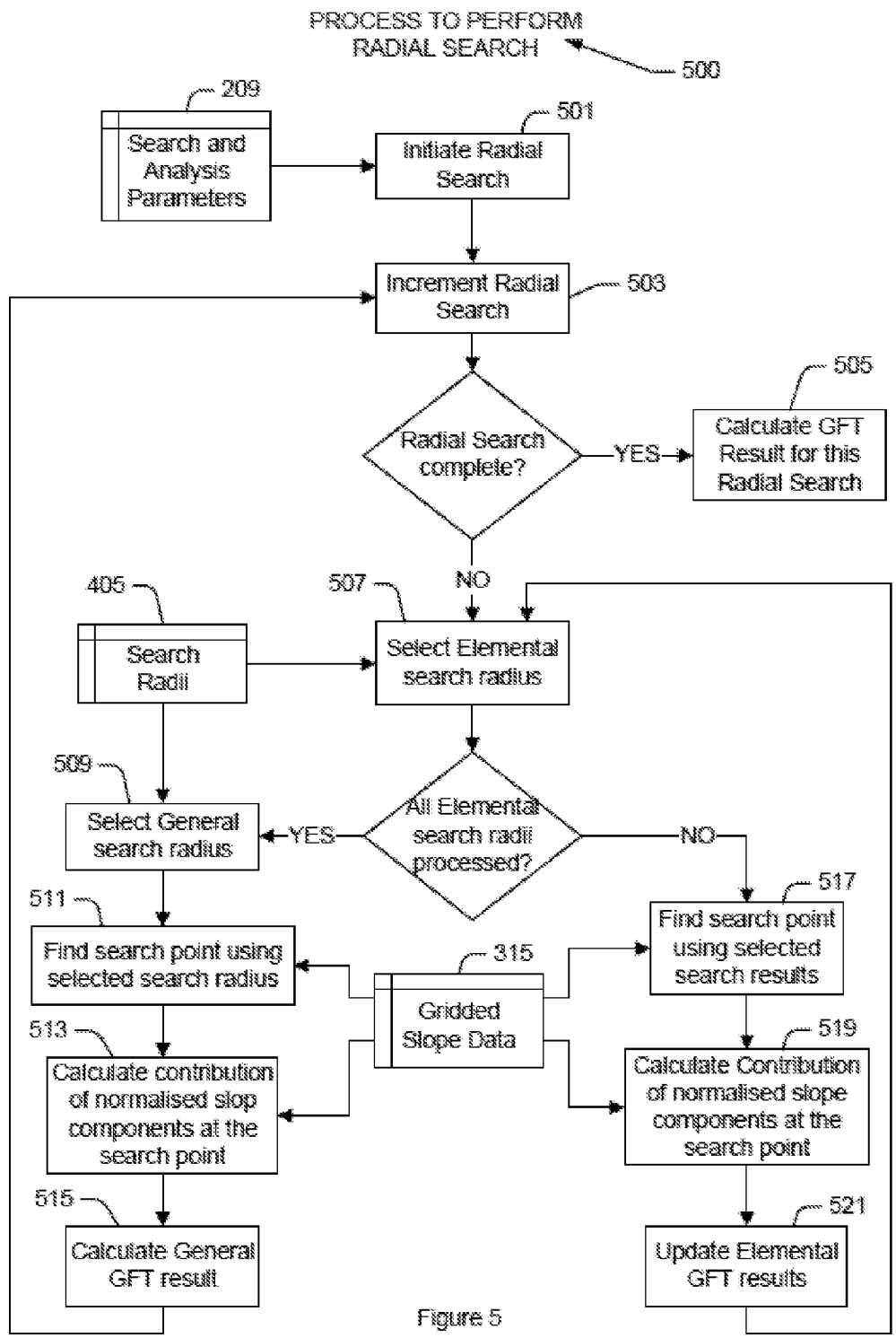

C. Search for the object(s) of interest using a Ground Feature Transform function (GFT) as depicted in FIGS. 4 and 5.

In step A, determining characteristic parameters for the search process is depicted in the flow chart of FIG. 2 and broadly comprises the steps of:

A.1 Determine 203, 207 the characteristic size of the entire object and the characteristic size of discriminatory elements/features of the object.

A.2 Determine 205 the slope analysis scale (in meters) for the entire object (g) and for the discriminatory elements (e).

A.3 Determine 211 the grid resolution. Note that the grid resolution is determined with reference to the characteristic size of discriminatory elements of the object. The grid must provide sufficient sampling points within the discriminatory elements of the object to allow analysis.

A.4 Determine 201 the number of search increments in the radial search with reference to the density of available sampling points within the discriminatory element. It is optimal that each search selects a unique data point.

In step B, the generation of a regular grid containing elevation and slope data is depicted in the flow chart of FIG. 3 and broadly comprises the steps of:

B.1 Triangulate 303 the ground points in the point-cloud data 301.

B.2 Generate 307, 311 a regular gridded height-field 309 (see for example gridded height field 309 of FIG. 7). The gridded height-field is created at the pre-determined grid resolution and is based on the elevation data in the triangulation.

B.3 Calculate 313 the local slope at each grid point wherein the local slope calculation at each point is based on the 9-point grid centred on that point and is represented as a vector.

B.4 Use the local slopes to calculate 317 the elemental and general slope vectors $\vec{S_e}$, $\vec{S_g}$ at each grid point to form the gridded slope data 315.

B.5 Use the elemental and general slope vectors to calculate a Feature Slope Vector FS at each grid point and store with the gridded slope data 315.

In step B.1, ground points of the LiDAR data are triangulated in step 303 of FIG. 3 to produce a Delaunay Triangulation. An example of the resulting Triangulated Irregular Network (TIN) 305 is depicted in FIG. 6. The height at each point on the grid is then determined by interpolating the height from the resulting Triangulated Irregular Network (TIN) 305 at the (x,y) location of each point in the grid. An example gridded height-field 309 is depicted in FIG. 7.

In Step C, method 400 the search for the objects of interest in the height-field data is depicted in the flow chart of FIGS. 4 and 5 and broadly comprises the steps of:

C.1 Determine 401 from the search and analysis parameters 209 two values that will be used to calculate in step 403 the search radii 405. These values will determine the size of the object that will be detected:

(i) $r_e$: elemental radius that would extend from the centroid of the object to the centroid of the discriminatory element of the object. The size of this radius should be determined with reference to the density of available sampling points within the discriminatory element since it is important to ensure that each search selects a unique data point.

(ii) $d_e$: expected variation in the size of the discriminatory element. This value will be used to calculate two additional search radii ($r_e+\frac{1}{2}d_e$; $r_e-\frac{1}{2}d_e$). These additional search radii are used to provide sufficient sampling points within the discriminatory element, and to improve the search for objects that are slightly elliptical.

An additional search radius is also calculated as follows:

$r_g$: general radius that would extend beyond the characteristic size of the entire object.

The general radius is calculated as $r_g=X*r_e$ where X is a suitable multiplier.

C.2 Determine 501 an incremental search angle from the number of search increments in the search and analysis parameters 209.

Figure 10:
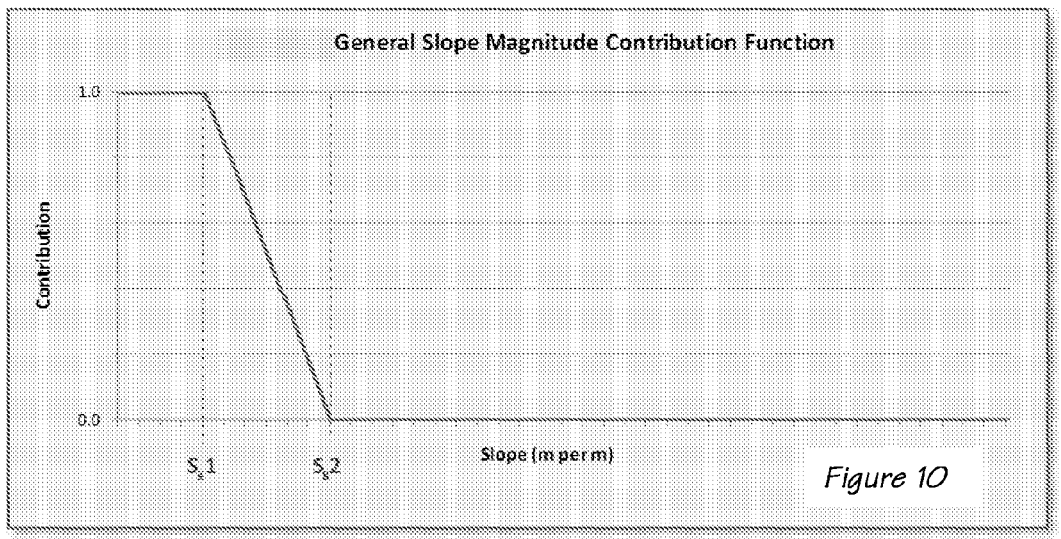
FIG. 10 shows an General Slope Magnitude Contribution Function according to the method of identifying on-ground or near-ground discrete objects as disclosed herein.
Figure 11:
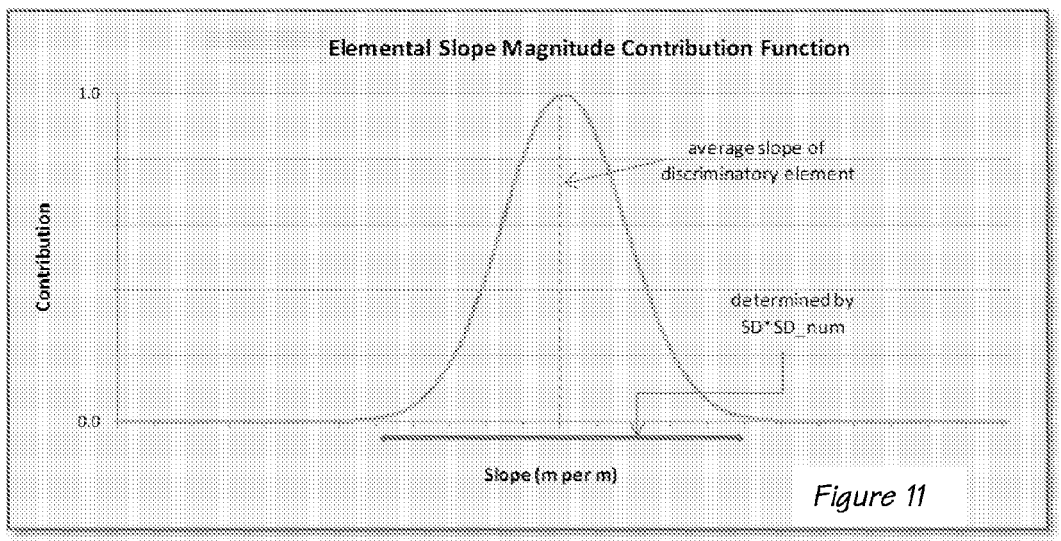
FIG. 11 shows a Elemental Slope Magnitude Contribution Function according to the method of identifying on-ground or near-ground discrete objects as disclosed herein.
Figure 12:
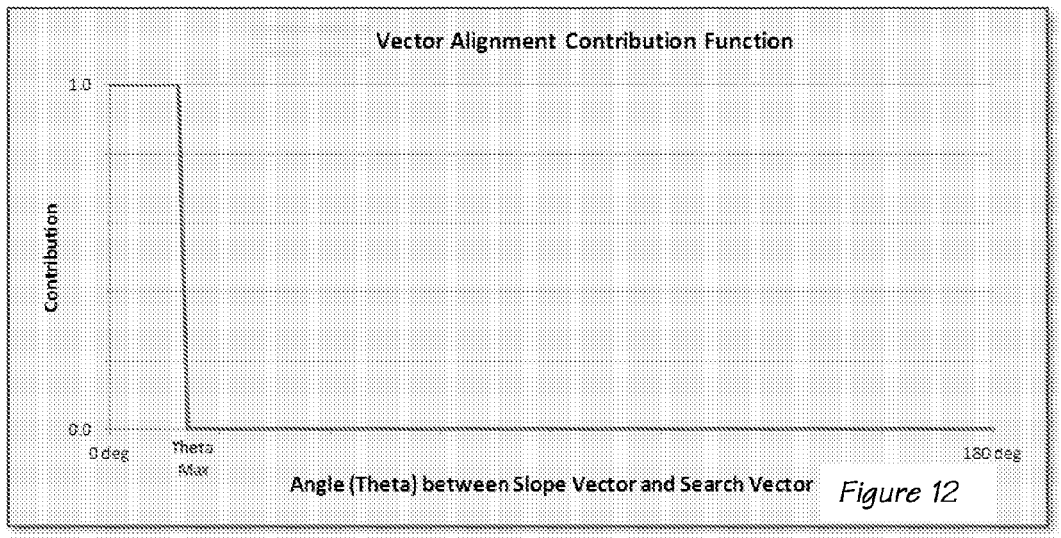
FIG. 12 shows a Vector Alignment Contribution function according to the method of identifying on-ground or near-ground discrete objects as disclosed herein.
Figure 13:
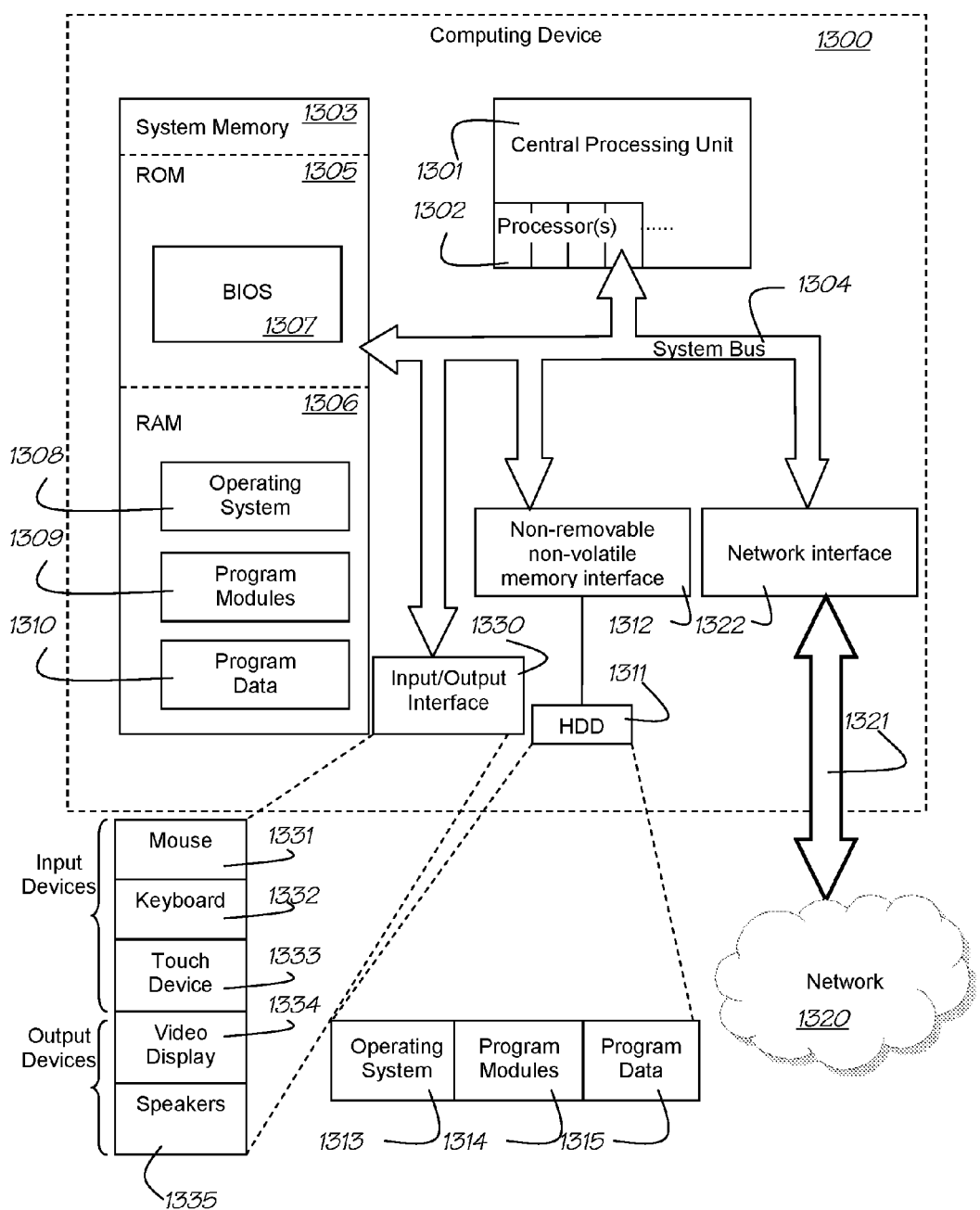
FIG. 13 shows a schematic for computing device 1300.

C.3 Search radially 500 from each grid point, using the incremental search angle 501. At each search angle increment perform the following tasks as seen in method 500 depicted in FIG. 5:

i. For each grid point, determine 507 the elemental search points at the search angle, based on the grid point, search angle and the elemental search radii $r_{ek}$ where in the present arrangement k=1 to 3 however more elemental search radii may be used as required.

ii. Determine 509 the general search point at the search angle, based on the grid point, search angle and the general search radius $r_g$ iii. Obtain 519 the Feature Slope Vectors for each elemental search point to give $\vec{FS_{e,k}}$ where in the present arrangement k=1 to 3 and calculate the magnitude and direction contributions of each $\vec{FS_{e,k}}$ to the Ground Feature Transform (GFT). The elemental Ground Feature Transform (GFT) represents the "votes" in favour of this grid point being located within the object. The contributions of each $\overrightarrow{FS}_{e,k}$ are determined by separately weighting the magnitude and direction components of each slope using the Elemental Slope Magnitude Contribution (ESMC) function as shown in FIG. 11 and the Vector Alignment Contribution (VAC) function as shown in FIG. 12. A high weighting is assigned for values closest to the characteristic values of the object's characteristic features. Note that the characteristic direction of the slope within the discriminatory element is close to the search direction. The characteristic magnitude of the slope is provided as input to the routine.

iv. Obtain 513 the Feature Slope Vectors for the general search point at radius $r_g$ to give $\overrightarrow{FS}_g$ and calculate the magnitude contribution of the Feature Slope Vector $\overrightarrow{FS}_g$ using the General Slope Magnitude Contribution (GSMC) function as shown in FIG. 10. The general Ground Feature Transform (GFT) represents one collection of "votes".

v. Calculate 505 the Ground Feature Transform value for this grid point as an aggregated value based on the elemental and general Ground Feature Transforms from each search point.

C.4 Returning to FIG. 4, once the GFT has been applied at each grid point, where the result exceeds a nominated threshold T in the search and analysis parameters 209 then store the result 411 in a grid 413 as a sparse matrix.

C.5 Iterate from step C.1 for a different search scale i.e. different values for $r_e$ and $d_e$.

Figure 8:
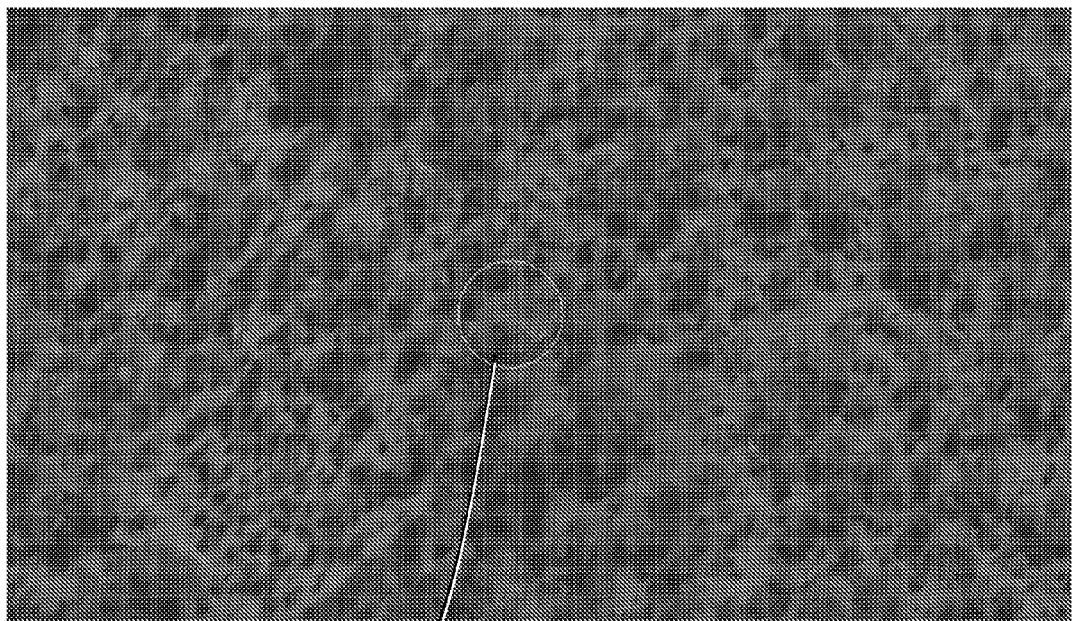
FIG. 8 shows an aerial photo of a sample region.
Figure 9:
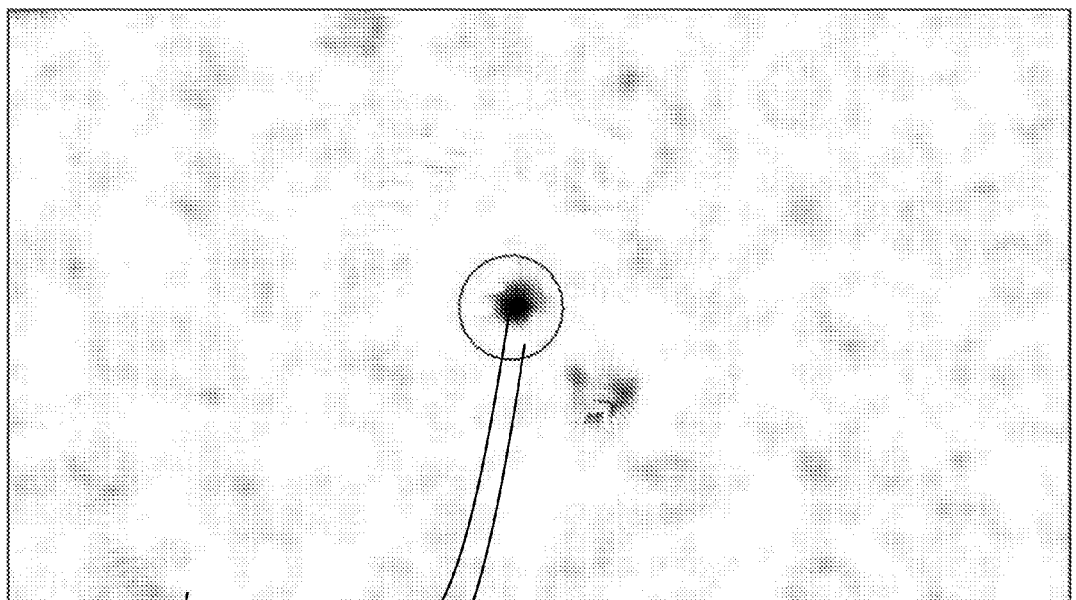
FIG. 9 shows sample output from the Ground Feature Transform (GFT) function for the region of FIG. 8.

Returning to FIG. 1 again, once the GFT has been applied across all grid points in the area of interest for a chosen range of radii, the resulting sparse matrices 413 are aggregated in step 103 using an aggregation process as would be appreciated by the skilled addressee. The aggregated results are then presented for further analysis 105, for example, as a greyscale image or images 109 (for example greyscale image 109 depicted in FIG. 9) to reveal clusters of grid cells that may represent the centre of an object (for example, see region 900 of FIG. 9 identifying a probable object 191 in the search area defined by the aerial image depicted in FIG. 8). As can be seen by comparing the region 900 of object 901 of the greyscale image 109 (of FIG. 9) obtained as a result of the object detection method disclosed herein with the aerial photograph of the same area 900 as shown in FIG. 8, the object 190 can clearly be identified within the search area from the results (image 109 of FIG. 9) of the presently disclosed object detection methods.

In alternate arrangements, the aggregated results may be presented as a data layer or layers 107 for a GIS system to be overlayed on a map of the search area so as to identify locations in the search area where one or more objects of interest are located.

The method 100 described above may be implemented in a data processing or computing apparatus in accordance with the following pseudo-code listing:

Description of the Process

The detection of on-ground discrete objects requires the following to be available prior to execution of the routines:
LiDAR data or other height sample information of sufficient point density to resolve the object;
classified data points; and
a descriptive model of the geometry of the object to be detected, including the characteristic size of the object and the size and nature of any characteristic features or discriminatory elements of the object that can be used to detect it.

The process involves the following steps:

A. Determine Characteristic Parameters for the Search Process (FIG. 2)
  A.1 Determine the characteristic size of the entire object and the characteristic size of discriminatory elements of the object.
  A.2 Determine the slope analysis scale (in meters) for the entire object (g) and for the discriminatory elements (e).
  A.3 Determine the grid resolution. Note that the grid resolution is determined with reference to the characteristic size of discriminatory elements of the object. The grid must provide sufficient sampling points within the discriminatory elements of the object to allow analysis.
  A.4 Determine the number of search increments in the radial search with reference to the density of available sampling points within the discriminatory element. It is optimal that each search selects a unique data point.

B. Generate a Regular Grid Containing Elevation and Slope Data (FIG. 3)
  B.1 Triangulate the ground points.
  B.2 Generate a regular gridded heightfield.
    The heightfield grid is created at the pre-determined grid resolution and is based on the elevation data in the triangulation.
  B.3 Calculate the local slope at each grid point
    The local slope calculation at each point is based on the 9-point grid centred on that point and is represented as a vector.
  B.4 Use the local slopes to calculate the elemental and general slope vectors $\overrightarrow{S}_e$, $\overrightarrow{S}_g$ at each grid point.
  B.5 Use the elemental and general slope vectors to calculate the feature slope vector as FS at each grid point.

C. Search for the Object Using the Ground Feature Transform Function (FIGS. 4 and 5)
  Note that the Ground Feature Transform (GFT) function is a modified Hough transform, developed by Umwelt. The GFT function is designed to detect subtle circular features within the data by analysing the slope of the terrain around each sample location in order to detect objects having a circular characteristic feature. The search proceeds radially from each data point at selected increments around the circle and using multiple search radii at each location (in an example arrangement, four search radii may be used). The search may be executed multiple times at each location in order to detect objects of different sizes. For each search execution:
  a. Determine two values that will be used to calculate the search radii. These values will determine the size of the object that will be detected.
    $r_e$: elemental radius that would extend from the centroid of the object to the centroid of the discriminatory element of the object.
    $d_e$: expected variation in the size of the discriminatory element. This value will be used to calculate two additional search radii ($r_e + \frac{1}{2}d_e$; $r_e - \frac{1}{2}d_e$). These additional search radii are used to provide sufficient sampling points within the discriminatory element, and to improve the search for objects that are slightly elliptical.

An additional search radius is calculated as follows:

$r_g$: general radius that would extend beyond the characteristic size of the entire object. The general radius is calculated as $r_g = X * r_e$ (Where X is a suitable multiplier)

b. Determine the incremental search angle based on the number of search increments (refer to A.4).

c. Search radially from each grid point, using the incremental search angle. At each search angle increment perform the following tasks:
   i. Determine the elemental search points at the search angle, based on the grid point, search angle and the elemental search radii $r_e$, $r_e + \frac{1}{2}d_e$, $r_e - \frac{1}{2}d_e$.
   ii. Determine the general search point at the search angle, based on the grid point, search angle and the general search radius $r_g$
   iii. Obtain the feature slope vectors for each search point from the slope grid.
      i. Calculate the GFT contribution at each elemental search point. The elemental GFT contribution represents the "votes" in favour of this grid point being within the object. The contribution is determined by separately weighting the magnitude and direction components of each slope using the Elemental Slope Magnitude Contribution (ESMC) function and the Vector alignment Contribution (VAC) function. A high weighting is assigned for values closest to the characteristic values of the object. Note that the characteristic direction of the slope within the discriminatory element is close to the search direction. The characteristic magnitude of the slope is provided as input to the routine.
      ii. Calculate the GFT contribution at the general search point. The general GFT contribution represents the "votes" in favour of this grid point NOT being within the object. The contribution is determined by weighting the magnitude of feature slope vector at the general search point using the General Slope Magnitude Contribution (GSMC) function. A high weighting is assigned for values closest to the characteristic values of the object. Note that the characteristic magnitude of the general slope is provided as input to the routine.

d. Calculate the GFT for this grid point as an aggregated value based on the GFT results from each search point, and where the result exceeds a nominated threshold T, store the result in a grid.

e. Iterate from step C.1 for a different search scale i.e. different values for $r_e$ and $d_e$.

f. Aggregate all result grids to reveal clusters of grid cells that may represent the centre of an object.

g. Present the results as a greyscale image and/or GIS layers for further analysis.

Gridding Method

A flow chart of the Gridding Method 300 is provided in FIG. 3

Input Parameters

BB_min_x bounding box corner point−minimum x
BB_min_y bounding box corner point−minimum y
BB_max_x bounding box corner point−maximum x
BB_max_y bounding box corner point−maximum y
grid_size height and width (in meters) of each cell within the height grid that is being created
e_scale scale (in meters) for calculating the average elemental slope at a point
g_scale scale (in meters) for calculating the average general slope at a point Pre-Requisite Data Structures Classified LiDAR data file containing elevation values Pseudo Code

```
// Create empty grid containing x,y coordinates
Num_cells_up= roundup(BB_max_y − BB_min_y+1)/grid_size
Num_cells_across= roundup(BB_max_x − BB_min_x+1)/grid_size
For i= 1 to num_cells_across
        For j=1 to num_cells_up
                Heightgrid(i,j,1)=BB_min_x+(i−1)*grid_size    //x coordinate
                Heightgrid(i,j,2)=BB_min_y+(j−1)*grid_size    //y coordinate
        Next j
Next i
// For all points within the bounding box produce a Delaunay Triangulation
Delaunay(BB_min_x, BB_min_y, BB_max_x, BB_max_y, point data)
// Populate the grid with height data from the triangulation
For all triangles
        // interpolate heights for each grid point within the triangle
Next triangle
// Calculate Slope
For all grid points i,j:
    //Calculate the local slope vector at the grid point
    Xcomponent(i,j) =  (elevation(i−1,j−1)+2*elevation(i−1,j)+elevation(i−1,j+1)
                    − (elevation(i+1,j−1)+2*elevation([i+1,j)+elevation(i+1,j+1)) )/(8*gridsize)
    Ycomponent(i,j) =  (elevation(i−1,j−1)+2*elevation(i,j−1)+elevation(i+1,j−1)
                    − (elevation(i−1,j+1)+2*elevation(i,j+1)+elevation(i+1,j+1)) )/(8*gridsize)
    magnitude(i,j) =   sqrt(x-component(i,j)²+ y-component (i,j)²)
Next i,j           // loop for all grid points
For all grid points i,j:
    //Calculate the elemental slope vector ($\vec{S}_e$) at the grid point
Next i,j       // loop for all grid points
For all grid points i,j:
    //Calculate the general slope vector ($\vec{S}_g$ )at the grid point
Next i,j       // loop for all grid points
For all grid points i,j:
    //Calculate the feature slope vector ( $\vec{FS}$ ) at the grid point
Next i,j       // loop for all grid points
End of Slope Function
```

Ground Feature Transform Method

A flow chart of the Ground Feature Transform method 400 is provided in FIG. 4:

Input parameters
- i,j coordinates of the grid point that is the search origin
- num_searches number of radial searches (search vectors) at each search origin
- eslope_avg average characteristic slope magnitude within the discriminatory element
- eslope_sd std deviation of the characteristic slope magnitude within the discriminatory element
- eslope_numsd number of std deviations used to define the width of the Gaussian curve used in the transform
- eTheta_max maximum optimal angle between the search vector and the slope vector within the discriminatory element
- gMag_max maximum optimal feature slope magnitude outside the feature
- T threshold used to select potential candidates Pre-Requisite Data Structures
- Slope grid containing feature slope vectors, $\overrightarrow{FS}$
- where the x and y components of the vector at grid point (i,j) are represented by FSx(i,j) and FSy(i,j) respectively Pseudo Code

```
gwidth= eslope_sd*eslope_numsd
// initialise result_grid and search number n
for varying values of r_e and d_e
    // Calculate search radii
    // Call the radial search at different search scales to find different
sized objects at this grid point.
        GFT=Radial_Search (i,j,r_e, d_e, num_searches,
        eTheta_max , eslope_avg, gwidth)
        n=n+1
        If GFT ≥ Threshold T then result_grid (i,j,n) = GFT
Next r_e and d_e
```

Radial Search Method 500

Flow chart is provided in FIG. 5

Input parameters
- i,j coordinates of the grid point that is the search origin
- $r_e$ characteristic distance from the centre of the object to the centre of the discriminatory element
- $d_e$ expected variation in characteristic distance from the centre of the object to the centre of the discriminatory element
- num_searches number of radial searches i.e. number of points to be assessed around each search origin
- eTheta_max maximum optimal angle between the search vector and the slope vector within the discriminatory element
- GB position of the peak of the Gaussian distribution (average value)
- GC width of the peak of the Gaussian distribution (multiple of the std dev)
- gMag_max maximum optimal feature slope magnitude outside the object Pre-requisite Data Structures
- Slope grid containing feature slope vectors, $\overrightarrow{FS}$
- where the x and y components of the vector at grid point (i,j) are represented by FSx(i,j) and FSy(i,j) respectively Pseudo Code $$\text{Search\_angle} = \frac{2\pi}{\text{num\_searches}}$$

```
r_g=2*r_e
re(1) = r_e
re(2) = r_e -0.5*d_e
re(3) = r_e +0.5*d_e
. i.e. // Initialise Ground Feature Transform values
GFT = 0            // Ground Feature Transform value at the search origin
// Start Radial Search
For each radial search (n=1 to num_searches)
    // SEARCH 1: within the discriminatory element
    // do 3 searches within the discriminatory element at search radii re(1), re(2) and re(3) calculated
above
    For k=1 to 3
        GFT_De(k)=0         // the contribution of the direction component of the slope
        GFT_Me(k)=0         // the contribution of the magnitude component of the slope
        Search_radius=re(k)
        // Find search point (i2,j2) using search angle and search_radius
        Dx= search_radius *cos(radians(n*search_angle))      // x distance from grid point to search
point
        Dy= search_radius *sin(radians(n*search_angle))      // y distance from grid point to search
point
        i2=i+dx; j2=j+dy                                     // i,j coords for search point
        // get the feature slope components at the search point from slope grid
        xcomponent = FSx (i2,j2)
        ycomponent = FSy (i2,j2)
        mcomponent = sqrt(xcomponent^2 + ycomponent^2)
        // calculate angle radtheta (in radians) between the search vector and the slope vector
    where:
```

// search vector = $\overrightarrow{(dx, dy)}$ with magnitude r;

// slope vector: $\overrightarrow{(xcomponent, ycomponent)}$ with magnitude mcomponent radtheta=acos((dx*xcomponent + dy*ycomponent)/( search_radius *mcomponent)

```
    // calculate the slope direction contribution from this search point; returns a value between
0 and 1
                                                      GFT_De(k) = VAC(radtheta, eTheta_max) //use the
Vector Alignment Contribution function
                                                      // Calculate the slope magnitude contribution at this
search point; returns a value between 0 and 1
                                                      GFT_Me(k) = ESMC (mcomponent,GB,GC)
    //use the Elemental Slope Magnitude Contribution function
                                                      GFT_ePoint(k)= GFT_De(k) * GFT_Me(k) //aggregated
result for this search point
    Next k.// repeat using the next elemental search radius
    // SEARCH 2: outside the feature
    Search_radius= r_g
    // Find search point (i2,j2) using search_angle and search_radius r_g
    Dx= search_radius *cos(radians(n*search_angle))      // x distance from grid point to search point
    Dy= search_radius *sin(radians(n*search_angle))      // y distance from grid point to search point
    i2=i+dx; j2=j+dy                                     // i,j coords for search point
    // get the magnitude of the feature slope at the search point from slope grid
    xcomponent = FSx (i2,j2)
    ycomponent = FSy (i2,j2)
    mcomponent = sqrt(xcomponent² + ycomponent²)
    // calculate the slope magnitude contribution contribution from this search point as the magnitude
of
    // the feature slope; returns a value between 0 and 1
    GFT_Mg = GSMC (mcomponent, gMag_max) //use the General Slope Magnitude Contribution function
    // RESULT: aggregate the results for this search vector
    // Aggregate GFT_Mg, GFT_ePoint(n) where n=1 to k to give a result between 0 and 1
```

$$GFT\_Result\ (n) = GFT\_Mg * \frac{\sum_{1}^{k} GFT\_ePoint(m)}{k}$$

```
Next n.   // next search vector . i.e. next increment in the radial search
// RESULT: aggregate the results for all search vectors
```

$$GFT = \frac{\sum_{1}^{num\_searches} GFT\_Result\ (n)}{num\_searches}$$

```
// End of Radial Search Method
```

Example

Malleefowl Mound Location

The method 100 for location of near-ground discrete objects has been used to examine the suitability of remote sensed data such as LiDAR data, for the purpose of locating the large, ground level mounds constructed by Malleefowl birds in Western Australia. The study area covered a remote and inaccessible mining exploration lease with an area of approximately 1100 km².

Malleefowl are a turkey sized, ground dwelling bird that was once found widely throughout Australia, however their habitat is now mostly limited to inland semi-arid scrub areas. They are a protected species under both State (Western Australian Wildlife Conservation Act 1950) and Commonwealth (Environmental Protection and Biodiversity Conservation Act 1999) legislation in Australia.

Due to their protected status, the location of any Malleefowl mounds must be determined before any major works can proceed in an area. The present method used for locating mounds is to walk over the ground within an exploration site, which can be very time-consuming and expensive. The investigation of the present example undertook to determine whether it is possible to detect Malleefowl mounds using a combination of remote sensed data (LiDAR, Air and Satellite photography, infra-red techniques).

A mating pair of Malleefowl will build large mounds out of sand and debris to protect their eggs from the summer heat. The male birds bury large amounts of rotting leaf matter in the mounds to maintain a constant temperature within the mound. The mounds are 2 m to 10 m in diameter and range from 0.5 m to 1.5 m in height. The physical characteristics of the mounds change throughout the year as the mounds are being rebuilt and maintained.

Malleefowl mounds are relatively low to the ground and are extremely difficult to locate using aerial photography alone. Standard LiDAR filtering methods using typical classification parameters will tend to classify the tops of tall mounds as low vegetation. A customised classification process that favoured the inclusion of mound sized objects was included into the terrain model. The resulting terrain model was then examined programmatically to locate possible mound sites. Additional information was employed in the process to constrain the search area to regions known to be favourable to mound building. This additional information includes soil type, terrain slope and aspect and proximity to drainage channels and surrounding vegetation.

A number of techniques were developed to allow efficient storage and analysis of large volumes of data required for the study. Processing of large volumes of data occurs through the use of parallel processing techniques, in which the dataset is divided into units of a size that may each be processed by a number of central processing units (CPUs) using a relatively inexpensive amount of random access memory (RAM). The dataset is divided into units having sufficient overlap with their neighbouring units that subsequent processing steps do not induce edge effects in the results. Distributed computing approaches were subsequently used to reduce the elapsed time required to perform the computationally intensive processes of scanning for possible mound sites. In this method, the units into which the dataset is divided are processed on a large number of CPUs simultaneously. A central CPU is used to distribute the units to the processing CPUs over a computer network and to collate the results returned from the processing CPUs. Two databases were used for, respectively, providing raw data units to individual CPUs to be processed and receiving the results of this processing. This method is intended to allow data processing effort to be scaled to the size of the dataset and the time available for processing, while retaining quality of analysis.

The method disclosed herein for detection and/or location of discrete on-ground or near-ground objects is provided as an example only and many alternate steps may be added and steps may be optional, depending on the particular application of the method and available data sets as would be appreciated by the skilled addressee It will, of course be appreciated by the skilled addressee that the above examples are presented for illustrative purposes only, and the system may be adapted for any type of industry or application where detection and/or location of discrete on-ground or near-ground objects is desired, or for processing of large datasets of terrain information (for example, LIDAR information) for locating discrete on-ground or near-ground objects As will be appreciated, such a system has extremely wide-reaching capabilities and the present invention may be readily adapted to many such applications.

Therefore, it will be appreciated that the methods/apparatus/devices/systems described/illustrated above at least substantially provide schemes for detection and/or location of discrete on-ground or near-ground objects and in particular to methods and apparatus for detection and/or location of discrete near-ground or near-ground objects using LiDAR data. The methods/apparatus/devices/systems described/illustrated above at least substantially further relate to detection and/or location of discrete on-ground or near-ground objects, at least for example, Malleefowl mounds or similar on-ground or near-ground objects.

The methods, apparatus and systems described herein, and/or shown in the drawings, are presented by way of example only and are not limiting as to the scope of the invention. Unless otherwise specifically stated, individual aspects and components of the methods, apparatus and systems may be modified, or may have been substituted therefore known equivalents, or as yet unknown substitutes such as may be developed in the future or such as may be found to be acceptable substitutes in the future. The methods, apparatus and systems may also be modified for a variety of applications while remaining within the scope and spirit of the claimed invention, since the range of potential applications is great, and since it is intended that the present methods, apparatus and systems be adaptable to many such variations.

The invention claimed is:

1. A method for detection of on-ground or near-ground discrete objects having characteristic features from a data set characterising a search area, the method comprising the steps of:

determining the characteristic features of a on-ground or near-ground object and the characteristic size of discriminatory elements of said on-ground or near-ground object;

determining a slope analysis scale for the on-ground or near ground object and for the discriminatory elements;

determining a suitable grid resolution with reference to the characteristic size of said discriminatory elements such that the grid provides sufficient sampling points within the scale of the discriminatory elements to permit identification of said discriminatory elements and thus identification of said on-ground or near ground object; and processing the data set to form a gridded data set comprising a regular grid having the determined grid resolution; and analysing said gridded data set to identify said on-ground or near-ground discrete objects within said search area.

2. A method as claimed in claim 1, wherein said data set includes terrain height data and said gridded data set comprises elevation and slope data at each point.

3. A method as claimed in claim 2, wherein the characteristic features of the on-ground or near-ground discrete object comprises one or more of shape, changes in shape, size, height, reflectance, absorbance, shadow, slope, aspect, or land-form context.

4. A method as claimed in claim 2, wherein the gridded height data comprises a gridded height-field having the determined grid resolution and elevation data at each grid point, said elevation data being determined by triangulation of ground points in the terrain height data.

5. A method as claimed in claim 2, wherein the slope data at each grid point is based on a 9-point grid centred at said grid point.

6. A method as claimed in claim 2, further comprising calculation of an elemental slope ($S_g$) a general slope ($S_e$) and a feature slope (FS) at each said grid point.

7. A method as claimed in claim 6 wherein the elemental slope is determined at a scale that is related to the size of the discriminatory elements of the object.

8. A method as claimed in claim 6, wherein the general slope is determined at a scale that relates to the size of the object as a whole.

9. A method as claimed in claim 2, wherein analysing said gridded terrain height data comprises the steps of:

using a Ground Feature Transform function (GFT), detecting features within said gridded height-field by analysing the slope of the terrain around each grid point of said gridded height-field.

10. A method as claimed in claim 9, wherein said GFT is adapted for detection of circular objects in said gridded height-field by analysing the slope of the terrain around each grid point.

11. A method as claimed in claim 10, wherein said circular objects comprise an on-ground or near-ground discrete object comprising a mallee-fowl mound, termite mound, drumlin, tumulus, crater or built object.

12. A method as claimed in claim 10, wherein said detection of circular objects comprises, for each grid point of the height-field data, analysing the slope of the height-field data radially from said grid point using at least one search radii characterising an on-ground or near-ground discrete object of interest at selected radial search increments.

13. A method as claimed in claim 12, wherein said radial analysis of said height-field data comprises use of four selected search radii representative of a characteristic size of a near-ground discrete object of interest for each radial search increment.

14. A method as claimed in claim 12, wherein said analysing of said slope of said height-field data comprises executing a plurality of searches for on-ground or near-ground discrete objects around each grid point.

15. A method as claimed in claim 14, wherein each said search for on-ground or near-ground discrete objects around each grid point comprises use of different search radii for detection of near-ground discrete objects of different sizes.

16. A method as claimed in claim 14, wherein for each search execution, said search for on-ground or near-ground discrete objects around each grid point comprises the steps of:
   a) determining two values for calculation of the search radii to determine the size of the on-ground or near-ground discrete object to be detected comprising:
      i) an elemental radius $r_e$ extending from the centroid of the object to the centroid of a discriminatory element of said object; and
      ii) an expected variation $d_e$ in the size of discriminatory element of said object
   b) determining an incremental search angle with reference to the density of available sampling points within the discriminatory element; and
   c) searching radially from each grid point in the gridded height-field using said incremental search angle.

17. A method as claimed claim 16, further comprising the steps of:
   d) calculating a Ground Feature Transform value for each grid point in the grid and where the resultant value exceeds a nominated threshold T, store the result in a grid; and
   e) repeating a) to d) for a new search radius.

18. A method as claimed in claim 17, further comprising the steps of:
   aggregating the result grids obtained for each search radius;
   aggregating result grids comprising clusters of grid cells corresponding to possible central grid points corresponding to said on-ground or near-ground discrete object of a given radius; and
   storing the aggregated result grids in an aggregated spare matrix and displaying the aggregated sparse matrix for further analysis of probable on-ground or near-ground discrete object locations.

19. A method according to claim 9 wherein the GFT is based on a modified Hough transform.

20. A system for detection of on-ground or near-ground discrete objects having characteristic features from a data set characterising a search area, said system comprising:
   input means for receiving an input comprising said data set;
   processing means for:
      determining the characteristic features of a on-ground or near-ground object and the characteristic size of discriminatory elements of said on-ground or near-ground object;
      determining a slope analysis scale for the on-ground or near ground object and for the discriminatory elements;
      determining a suitable grid resolution with reference to the characteristic size of said discriminatory elements such that the grid provides sufficient sampling points within the scale of the discriminatory elements to permit identification of said discriminatory elements and thus identification of said on-ground or near ground object; and
      processing the data set to form a gridded data set comprising a regular grid having the determined grid resolution;
   analysis means for analysing said gridded data set to identify said on-ground or near-ground discrete objects within said search area; and
   output means for outputting a representation of said analysed gridded data set for detection of on-ground or near-ground discrete objects.

21. A non-transitory computer readable medium comprising a program for detection of on-ground or near-ground discrete objects having characteristic features from terrain height data characterising a search area, said program controlling the operation of a data processing apparatus on which the program executes to perform the steps of:
   processing the terrain height data to form a regular grid containing elevation and slope data at each grid point;
   analysing said gridded terrain height data to identify said on-ground or near-ground discrete objects within said search area
   wherein said forming of said regular grid comprises the steps of:
      determining the characteristic features of a on-ground or near-ground object and the characteristic size of discriminatory elements of said on-ground or near-ground object;
      determining a slope analysis scale for the on-ground or near ground object and for the discriminatory elements;
      determining a suitable grid resolution with reference to the characteristic size of said discriminatory elements such that the grid provides sufficient sampling points within the scale of the discriminatory elements to permit identification of said discriminatory elements and thus identification of said on-ground or near ground object; and
      processing the terrain height data to form a gridded height data comprising a regular grid having the determined grid resolution wherein said gridded height data comprises elevation and slope data at each grid point.

22. A method for detection of on-ground or near-ground discrete objects having characteristic features from terrain height data characterising a search area, the method comprising the steps of:
   processing the terrain height data to form a regular grid containing elevation and slope data at each grid point; and
   analysing said gridded terrain height data to identify said on-ground or near-ground discrete objects within said search area, the analysing being performed by using a Ground Feature Transform function (GFT), detecting features within said gridded height-field by analysing the slope of the terrain around each grid point of said gridded height-field;
   wherein said GFT is adapted to analyse the slope of the terrain around each grid point of the height-field data by executing a plurality of searches for on-ground or near-ground discrete objects around each grid point using at least one search radii characterising an on-ground or near-ground discrete object of interest at selected search increments, wherein for each search execution, said search for on-ground or near-ground discrete objects around each grid point comprises the steps of:
a) determining two values for calculation of the search radii to determine the size of the on-ground or near-ground discrete object to be detected comprising:
  i) an elemental radius re extending from the centroid of the object to the centroid of a discriminatory element of said object; and
  ii) an expected variation de in the size of discriminatory element of said object
b) determining an incremental search angle with reference to the density of available sampling points within the discriminatory element; and
c) searching radially from each grid point in the gridded height-field using said incremental search angle,
d) calculating a Ground Feature Transform value for each grid point in the grid and where the resultant value exceeds a nominated threshold T, store the result in a grid;
e) repeating a) to d) for a new search radius
f) aggregating the result grids obtained for each search radius;
g) aggregating result grids comprising clusters of grid cells corresponding to possible central grid points corresponding to said on-ground or near-ground discrete object of a given radius; and
h) storing the aggregated result grids in an aggregated spare matrix and displaying the aggregated sparse matrix for further analysis of probable on-ground or near-ground discrete object locations.

* * * * *